United States Patent [19]

Inui et al.

[11] Patent Number: 4,940,446
[45] Date of Patent: Jul. 10, 1990

[54] COUPLING STRUCTURE FOR A ROTATING MEMBER AND A SHAFT

[75] Inventors: Masaki Inui; Mitsuhiko Okada; Seitoku Kubo; Shozoh Okuda; Masaki Hosono, all of Toyota, Japan

[73] Assignee: Toyota Jidosha Kabushiki Kaisha, Toyota, Japan

[21] Appl. No.: 101,831

[22] Filed: Sep. 28, 1987

[30] Foreign Application Priority Data

Sep. 26, 1986 [JP] Japan ................................. 61-22778
Sep. 26, 1986 [JP] Japan ................................. 61-227789
Nov. 6, 1986 [JP] Japan ................................. 61-264642
Nov. 10, 1986 [JP] Japan ................................. 61-267294

[51] Int. Cl.$^5$ ............................................. F16H 57/04
[52] U.S. Cl. ........................................ 474/91; 474/144
[58] Field of Search .................. 474/91, 94, 144, 152, 474/903; 277/152; 184/6.12, 11.1, 13.1; 74/15.84, 15.86, 15.88, 467, 665 GE, 740; 180/243, 246

[56] References Cited

U.S. PATENT DOCUMENTS

| | | | |
|---|---|---|---|
| 3,111,864 | 11/1963 | Christian | 74/740 |
| 4,090,748 | 5/1978 | Sugimoto et al. | 184/11.1 X |
| 4,369,671 | 1/1983 | Matsumoto et al. | 74/740 X |
| 4,699,249 | 10/1987 | Fujiura et al. | 474/91 X |

Primary Examiner—Jerome W. Massie, IV
Assistant Examiner—Matthew Smith
Attorney, Agent, or Firm—Oblon, Fisher, Spivak, McClelland & Maier

[57] ABSTRACT

A rotating member such as a sprocket to be coupled with a shaft is formed with a fitting bore which extends on the center axis and opens at at least one of its axial end portions. The rotating member is arranged in and rotatably held by a case such that its fitting bore opens toward the outside of the case. The shaft is inserted into and coupled with the fitting bore held in the case such that it can rotate integrally with the rotating member. This rotating member is formed with an air communication portion for providing communication between the inside and outside of the fitting bore and equipped with a valve for opening or closing the air communication portion. The valve may be opened in response to the rise or drop in the internal pressure of a fitting bore, by the pressure of the shaft or by a centrifugal force. With the valve being closed, lubrication oil in the case is prevented from leaking. When the valve is opened, on the other hand, the air in the fitting bore is released, or the atmospheric air is introduced into the fitting bore. As a result, the insertion or extraction of the shaft is prevented from being obstructed even with fluctuations in the internal pressure of the fitting bore.

27 Claims, 8 Drawing Sheets

COUPLING STRUCTURE FOR A ROTATING MEMBER AND A SHAFT

BACKGROUND OF THE INVENTION

The present invention relates to a structure for coupling a rotating member such as a sprocket and a shaft such as a rotating shaft and, more particularly, to a structure for coupling a shaft with a rotating member held in a case.

Generally speaking, the switching of a power transmission line is accomplished by interposing a transmission mechanism between a drive shaft and a follower shaft and is exemplified by the transfer mechanism of a four wheel drive torque transfer mechanism for a vehicle, as is disclosed in Japanese Patent KOKAI Nos. 55-72420 and 60-241575 and U.S.P. No. 4,369,671. In the four wheel drive torque transfer mechanism disclosed in those specifications, the drive force given from the output shaft of the transmission assembly is distributed through a center differential to a rear wheel output shaft and a drive sprocket, or the drive force given from the transmission assembly to the rear wheel output shaft is distributed through a clutch to the drive sprocket so that it may be applied from the drive sprocket through a chain and a driven sprocket to a front wheel output shaft. In the chain transmission means used herein, for example, the driven sprocket is splined to the front wheel output shaft, which is fitted in a case through bearings, so that it is rotatably supported. Alternatively, the drive sprocket and the front wheel output shaft are integrally manufactured in advance, and a bearing is fitted on the portion of the front wheel output shaft, which projects in the axial direction from the toothed central portion, so that the front wheel output shaft is rotatably supported through that bearing. A front propeller shaft is coupled through a universal joint or the like with the front wheel output shaft which is rotatably supported in the case, as described above.

Here, in the coupling structure for coupling the front wheel output shaft and the front propeller shaft of the transmission mechanism described above according to the prior art, the spline-fitted portions of those shafts are exposed to the outside so that they naturally cannot be lubricated with the lubrication oil in the case but have lubrication which may be deteriorated by dust or the like if they are lubricated with grease. This may possibly affect the durability. In the aforementioned structure, moreover, the four wheel torque transfer mechanism is assembled by accommodating the front wheel output shaft in the case and bearing the same by the bearings, and the front propeller shaft is coupled through the universal joint with the end portion of the front wheel output shaft. In case, therefore, the dynamic balance of the front propeller shaft is to be inspected and adjusted, these inspections and adjustments must be accomplished separately, although the front propeller shaft rotates together with the front wheel output shaft. This raises a problem that the dynamic balance cannot be accurately set or adjusted because the dynamic balance in the actually mounted state is not always recognized.

In the transmission mechanism of the prior art thus far described, furthermore, a member such as a flange yoke or a yoke sleeve is fitted on the outer circumference of the portion of the front wheel output shaft, which projects from the bearing at the front side (i.e., as viewed when the transmission mechanism is mounted on the vehicle), when the universal joint for coupling the front wheel output shaft and the front propeller shaft is to be coupled with the front wheel output shaft. As a result, the front wheel output shaft is required to have not only bosses positioned at the two sides across the driven sprocket for fitting thereon two bearings but also a fitting allowance for fitting the yoke sleeve so that its total length must be increased. Especially in the aforementioned four wheel drive torque transfer mechanism for an FR (i.e., Front-engine Rear-drive) vehicle, the front propeller shaft is required to have a constant length or more, and the universal joint coupling the front wheel output shaft and the front propeller shaft cannot be disposed in front of a fixed position, in order to void making contact with an oil pan. Consequently, in the four wheel drive torque transfer mechanism for the FR vehicle, the front wheel output shaft has to be located at a more rearward position than necessary. In other words, the total length of the four wheel drive torque transfer mechanism in the structure thus far described has to be increased more than necessary, and adaptors have to be installed between some members in the four wheel drive torque transfer mechanism, which invites an increase in the weight.

SUMMARY OF THE INVENTION

The present invention has an object to provide a coupling structure for coupling a rotating member and a shaft, which can reduce the axial length thereof. In the present invention, therefore, a rotating member accommodated in and rotatably held by a case is formed with a fitting bore which extends on the center axis and opens toward the outside of the case, and a shaft is inserted into and coupled with the fitting bore so that it may rotate integrally with the rotating member.

Another object of the present invention is to provide a coupling structure for coupling a rotating member and a shaft, which can shorten the axial length and simplify the coupling operation while preventing lubrication oil from leaking out of the case. In the present invention, therefore, the rotating member is formed with a fitting bore extending on its center axis, an air communication portion for providing communication between the fitting bore and the inside of the case, and valve means for opening or closing the air communication portion.

Still another object of the present invention is to provide a coupling structure for coupling a rotating member and a shaft, which can damp the fluctuations in the internal pressure of the fitting bore formed in the rotating member for receiving the shaft, through an increase or decrease in the internal volume of the fitting bore by displacing a piston member.

A further object of the present invention is to provide a coupling structure for coupling a rotating member and a shaft, in which valve means disposed in an air communication portion for providing communication between a fitting bore formed in the rotating member for receiving the shaft and the inside of a case is opened by the push of the shaft or a centrifugal force so as to lubricate the gap between the inner face of the fitting bore and the shaft inserted into the fitting bore.

Other objects and features of the present invention will become apparent from the description which will be made in the following.

DESCRIPTION OF THE PREFERRED EMBODIMENTS

Figure 1:
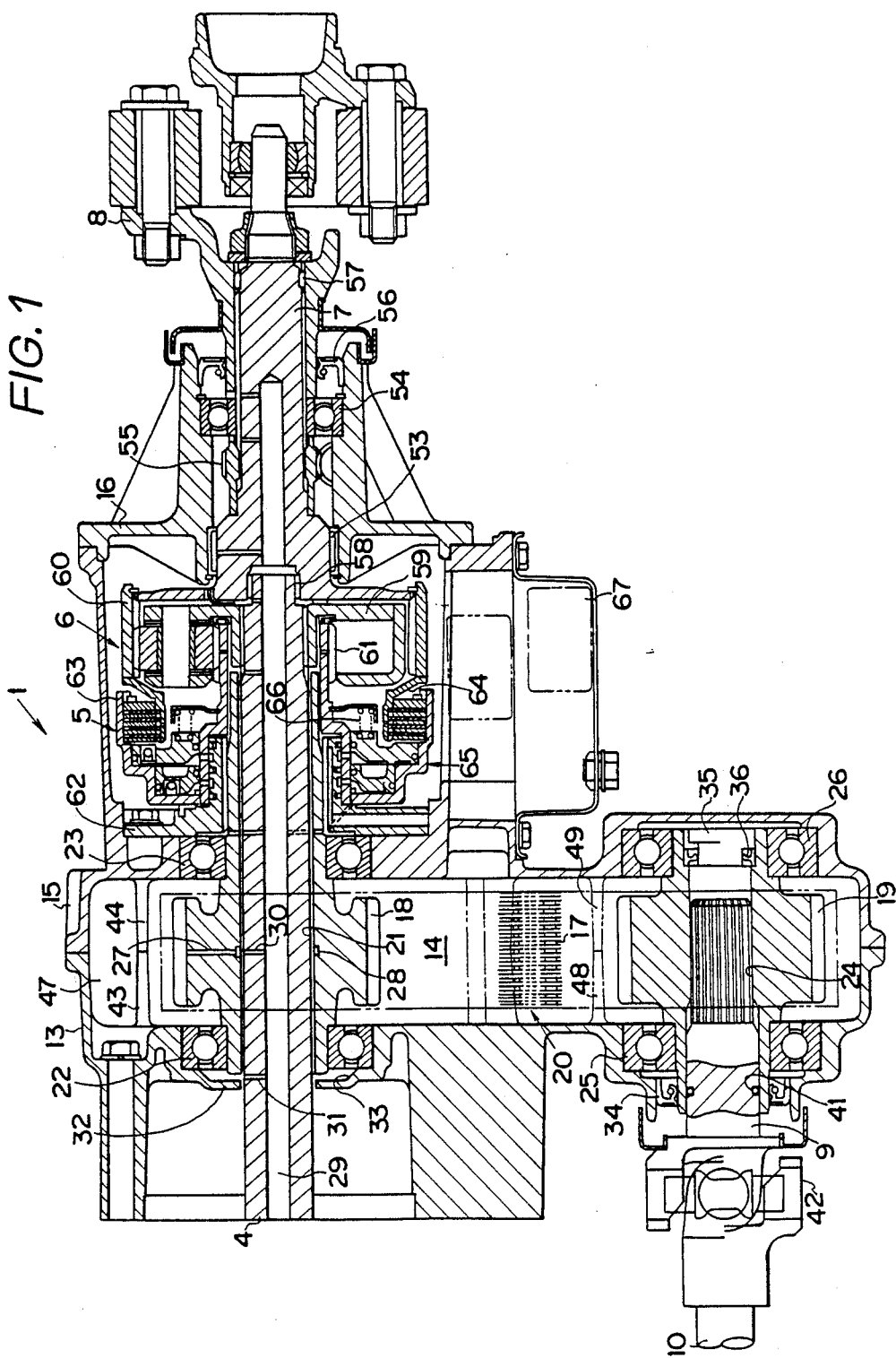
FIG. 1 is a sectional view showing a transfer mechanism used for a four wheel drive vehicle and having a coupling structure according to the present invention.
Figure 2:
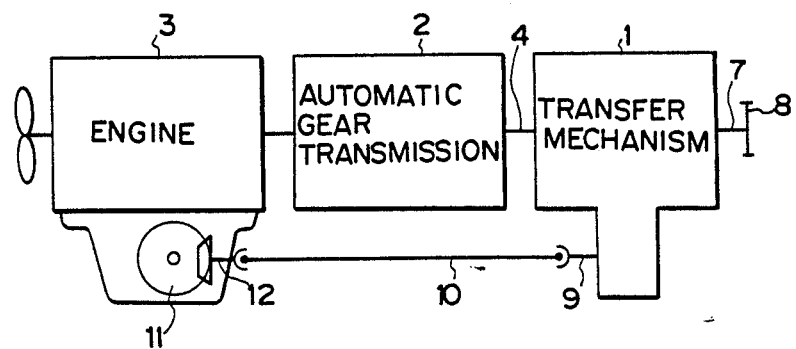
FIG. 2 is a simplified diagram showing a transmission line of the drive power.

FIG. 1 shows in detail a four wheel drive torque transfer mechanism 1 to which the present invention is applied, and FIG. 2 shows the automatic drive power transmission line of a front engine rear wheel drive (which is usually referred to as "FR") vehicle, in which the transfer mechanism 1 is assembled. As shown in FIG. 2, more specifically, an automatic gear transmission assembly 2 constructed mainly of a torque converter and a plurality of planetary gear mechanisms is arranged at the back of an engine 3 and backed by the transfer mechanism 1, and a transmission output shaft 4 comprises the input shaft of the transfer mechanism 1. This transfer mechanism 1 distributes the drive force between the rear and front wheels through a center differential 6 which has its differentiation limited by a slip-controlled differential control clutch 5. A rear wheel output shaft 7 in the transfer mechanism 1 is aligned with the transmission output shaft 4 and carries a companion flange 8 with which a (not-shown) rear propeller shaft is coupled. On the other hand, a front wheel output shaft 9 is arranged in parallel with the transmission output shaft 4 and coupled with a front propeller shaft 10, which in turn is coupled with a pinion drive shaft 12 of a front differential 11.

The case for accommodating the functional parts of the transfer mechanism 1 is composed, as shown in FIG. 1, of a front case 13 connected to the case of the automatic gear transmission assembly 2, a rear case 15 connected to the front case 13 for defining a chain chamber 14 together with the front case 13 and for accommodating the aforementioned differential control clutch 5 and the center differential 6, and an extension housing 16 connected to the back of the rear case 15. The facing portions of the front case 13 and the rear case 15 are slightly recessed in the opposite directions on the axis of the transmission output shaft 4 such that the recesses thus formed extend in the radial direction of the transmission output shaft 4. As a result, the individual recesses define the chain chamber 14 when the front case 13 and the rear case 15 are connected in close contact to each other. In this chain chamber 14, there is accommodated a transmission mechanism 20 which is composed of a silent chain 17, a drive sprocket 18 and a driven sprocket 19 both meshing with the silent chain 17. The drive sprocket 18 is formed with a fitting bore 21 on its center axis and has its boss extending short at the front side (i.e., at the lefthand side of FIG. 1) and long at the rear side (i.e., at the righthand side of FIG. 1). As a result, the drive sprocket 18 is rotatably held in the front and rear cases 13 and 15 through a pair of bearings 22 and 23 which are fitted in the outer circumferences of the bosses of the drive sprocket 18. The transmission output shaft 4 is penetrated in a non-contact state in the fitting bore 21 of the drive sprocket 18 such that they are concentric relative to each other. On the other hand, the driven sprocket 19 is formed with a coupling fitting bore 24 on its center axis and is rotatably held in the radially extending portions of the aforementioned front and rear cases 13 and 15 through bearings 25 and 26 which are fitted on the front and rear boss portions on opposite sides of the teeth of the driven sprocket 19. In this state, the driven sprocket 19 is arranged in parallel with the drive sprocket 18 and has its rear side (i.e., righthand side of FIG. 1) end portion positioned in the rear case 15 and its front side (i.e., lefthand side of FIG. 1) end portion opened forward, together with the front case 13. The aforementioned silent chain 17 is made to mesh with those two sprockets 18 and 19.

In the transmission mechanism 20 thus constructed, the drive sprocket 18 is formed with an oil port 27 which opens into one root of the sprocket teeth and the inner face of the fitting bore 21, and this fitting bore 21 is formed in its inner circumference with a circumferential groove 28 which opens into the opening of the oil port 27. On the other hand, the transmission output shaft 4 is formed on its center axis with a lubrication oil passage 29 which extends to the front end portion thereof to communicate with the (not-shown) oil pressure source such as an oil pump of the automatic gear transmission assembly 2. The transmission output shaft 4 is further formed at its portion corresponding to the aforementioned circumferential groove 28 with a sprocket oil port 30 which radially extends from the lubrication oil passage 29 to reach the outer circumference. As a result, the lubrication oil pumped out of the oil pressure source of the automatic gear transmission assembly 2 is supplied to the teeth of the drive sprocket 18 by way of the sprocket oil port 30, the groove 28 and the oil port 27.

Figure 3:
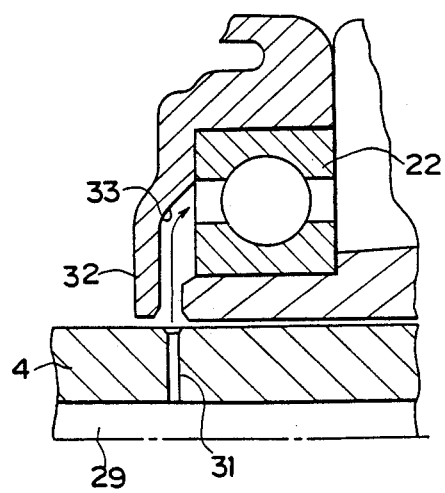
FIG. 3 is an enlarged fragmentary section showing an oil guide.

Moreover, the front boss of the drive sprocket 18 is made as long as the width of the bearing 22 to allow a bearing oil port 31 to open into a position immediately adjacent of the leading end portion of that boss. Like the aforementioned sprocket oil port 30, the bearing oil port 31 is so formed in the transmission output shaft 4 as to extend radially thereof. The front case 13 is formed therein with an oil guide 32 for guiding the oil spurting from that bearing oil port 31 into the bearing 22. More specifically, the oil guide 32 is an annular member which has an opening diameter slightly larger than the external diameter of the transmission output shaft 4. This annular oil guide 32 is formed integrally with the front case 13 in a manner so as to slightly extend forward from that portion of the front case 13 which retains the outer race of the aforementioned bearing 22. The oil guide 32 has its leading end portion (or inner circumferential edge) positioned in front of the opening of the aforementioned bearing oil port 31 so as to cover the same opening, as better seen from FIG. 3. Moreover, this oil guide 32 has a portion of its inner face formed into a guide face 33 which is inclined at 45 degrees, for example, to guide the radial oil jet into the gap between the outer and inner races of the bearing 22.

Figure 4:
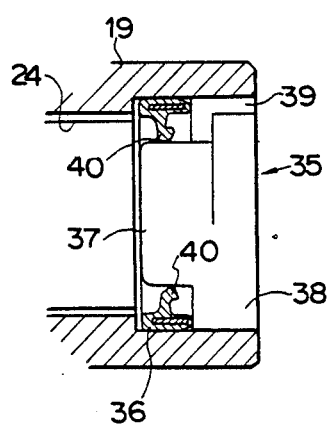
FIG. 4 is a fragmentary section showing a plug and an oil seal.

On the other hand, the driven sprocket 19 forming part of the transmission mechanism 20 is equipped with means for preventing oil leakage. That is to say, an oil seal 34 is fitted on the outer circumference of the front boss of the driven sprocket 19, and an oil seal 36 is fitted in the end portion of the fitting bore 24, which is positioned in the rear case 15, for sealing up a plug 35 itself and the gap between the plug 35 and that end portion. The plug 35 and oil seal 36 are provided for preventing the oil from flowing into the fitting bore 24 before the front wheel output shaft 9 is fitted in the fitting bore 24 and for releasing the air when the front wheel output shaft 9 is inserted, as will be described in more detail with reference to FIG. 4. The plug 35 is composed of a short stem 37 having a smaller diameter than the internal diameter of the fitting bore 24, and a flange 38 closely fitted in the inner circumference of the open end of the fitting bore 24. The flange 38 is partially cut away to form a slit 39. This slit 39 acts as the so-called "air vent" for providing communication between the inside and outside of the fitting bore 24. On the other hand, the oil seal 36 is fitted between the stem 37 and the inner circumference of the fitting bore 24 and has its annular lip 40 of thin film extending radially inward to contact with the outer circumference of the stem 37. This lip 40 can be warped by the pressure difference between the inside and outside of the fitting bore 24 so that it substantially acts as a valve.

The front wheel output shaft 9 is inserted from the front side and splined in the fitting bore 24 of the driven sprocket 19 thus constructed, and an 0-ring 41 is interposed to seal up the clearance between the front wheel output shaft 9 and the inner circumference of the fitting bore 24. The front propeller shaft 10 is coupled with the front end of the front wheel output shaft 9 through a joint 42 such as a universal joint.

Incidentally, the front wheel output shaft 9 can be exemplified by a sleeve yoke in case the joint 42 is constructed of the universal joint, as shown in FIG. 1.

Figure 5:
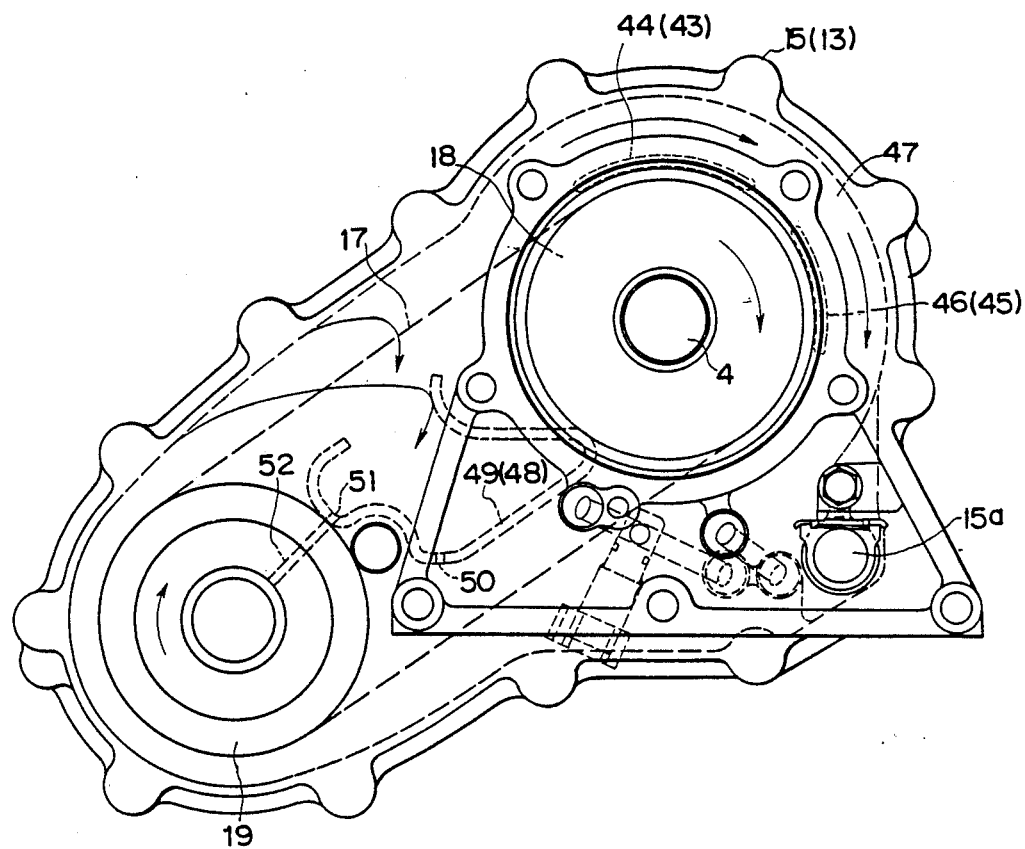
FIG. 5 is a back elevation showing a rear case, as viewed from the back of the vehicle.

Next, the structure for circulating the oil in the chain chamber 14 will be described in the following. Since the transmission mechanism 20 receives the forced lubrication from the drive sprocket 18, as has been described above, the rear case 15 is formed with an oil drain port 15a for returning the oil to an (not-shown) external oil reservoir such as an oil pan. In FIG. 5, presenting the rear case 15 from the rear side of the vehicle, more specifically, the driven sprocket 19 is arranged below and to the left of the drive sprocket 18, and arcuate ribs 43, 44, 45 and 46 projecting from the respective opposite faces of the aforementioned front and rear cases 13 and 15 are located above and beside the drive sprocket 18. The paired ribs 43 and 44, and 45 and 46 abut against each other to form partitions which define an oil passage 47 around the outer circumference of the drive sprocket 18. The oil drain port 15a is positioned to receive the drops of the oil from the oil passage 47.

From those portions of the individual opposite faces of the front and rear cases 13 and 15, which are located between the aforementioned individual sprockets 18 and 19, there project oil catching ribs 48 and 49 which have their leading ends abutting against each other. These oil catching ribs 48 and 49 are so curved as to form oil catching upward faces while avoiding interference with the transmission mechanism 20 and so on, as seen from FIG. 5. The oil catching ribs 48 and 49 are formed at their central portion with a chain lubrication port 50 for dropping the oil to the aforementioned silent chain 17 so that the silent chain 17 is lubricated without any special requirement for an oil pan. An oil seal lubrication port 51 is also formed in a predetermined portion of the oil catching rib 48 in a position close to the inner wall of the chain chamber 14. The oil seal lubrication port 51 thus formed has communication with an oil passage 52 which is so formed in the front case 13 as to reach the oil seal 34 fitted on the outer circumference of the boss of the driven sprocket 19.

The rear wheel output shaft 7 is rotatably held by a pair of bearings 53 and 54 in the extension housing 16 which is fixed to the rear side of the rear case 15. A gear 55 for driving a device sensing the running speed of the vehicle is carried on a middle portion of the rear wheel output shaft 7 whereas the companion flange 8 is splined on the rear end portion of the output shaft 7. An oil seal 56 seals up the gap between the companion flange 8 and the extension housing 16, and an O-ring 57 seals up the gap between the rear wheel output shaft 7 and the companion flange 8. Moreover, the leading end portion of the transmission output shaft 4 is borne in the root end portion (i.e., the lefthand end portion of FIG. 1) of the rear wheel output shaft 7 through a bearing 58.

The center differential 6 for distributing the drive force of the transmission output shaft 4 between the rear and front wheel sides and the differential control clutch 5 for limiting the differentiation of the center differential 6 are constructed in the following manner. The center differential 6 is constructed of a planetary gear mechanism, in which a carrier 59 for holding a planetary pinion is splined on the end portion of the transmission output shaft 4 whereas a ring gear 60 is integrated with the rear wheel output shaft 7. On the other hand, a sun gear 61 splined on the extension of the boss of the aforementioned drive sprocket 18 has a cylindrical portion extending to the front side (i.e., the lefthand side of FIG. 1) of the vehicle. This cylindrical portion is rotatably fitted on the boss of a support 62 which is fixed in the rear case 15. On the other hand, the differential control clutch 5 is a wet type multiple disc clutch which has its clutch drum 63 integrated with the cylindrical portion of the aforementioned sun gear 61 extending to the aforementioned support 62 and its clutch hub 64 integrated with the ring gear 60 of the center differential 6.

The extending cylindrical portion of the sun gear 61 and the clutch drum 63 form together a cylinder, in which two larger and smaller pistons are fitted in tandem to construct a hydraulic servo mechanism 65 for actuating the differential control clutch 5. The hydraulic servo mechanism 65 thus constructed moves the piston against the action of a return spring 66 to apply the differential control clutch 5 and is controlled by a hydraulic controller 67 which is arranged in the lower side of the rear case 15. In the embodiment shown in FIG. 1, the differential limitation of the center differential 6 can be affected to increase the distribution ratio of the torque to the rear wheels by holding the differential control clutch 5 in engagement at all times by a force of a certain level.

Moreover, the transmission output shaft 4 is formed at its necessary portions with oil ports extending from the lubrication oil passage 29 to the outer circumference thereof, and the sun gear 61 of the center differential 6 is formed with an oil port extending from the inner circumference to one root of the teeth thereof for supplying the oil to the tooth surfaces. Still moreover, the rear wheel output shaft 7 is formed with a lubrication oil passage, which extends on its center axis over a predetermined length from its root end portion, and is formed at its necessary portions with oil ports extending from the lubrication oil passage to the outer circumference thereof.

The assembly of the four wheel drive torque transfer mechanism 1 thus constructed is basically accomplished by assembling the transmission mechanism 20 including the drive sprocket 18 and the driven sprocket 19 in the front case 13, by subsequently connecting the rear case 15 to the front case 13, by assembling the differential control clutch 5, the center differential 6 and so on in the rear case 15, and by finally attaching the extension housing 16 and the companion flange 8. In other words, the parts are first assembled in the cases such as the front and rear cases 13 and 15. In this case, the aforementioned driven sprocket 19 is attached by itself to the front and rear cases 13 and 15 through the paired bearings 25 and 26 fitted on the outer circumferences of the bosses of the driven sprocket 19. As a result, the front wheel output shaft 9 need not be purposely fitted on the driven sprocket 19 but rather can be coupled with the front propeller shaft 10 through the joint 42. In this case, moreover, the fitting bore 24 of the driven sprocket 19 is sealed up by the plug 35 and the oil seal 36, and the gap between the boss of the driven sprocket 19 and the front case 13 is sealed up by the aforementioned oil seal 34. This will prevent the lubrication oil from leaking out of the case even if the chain chamber 14 is filled up in advance with the oil. With the structure thus far described, the front propeller shaft 10 can be balanced while being coupled with the front wheel output shaft 9 so that its dynamic balance can be measured and adjusted as if it were mounted on an actual vehicle.

After the internal parts including the aforementioned transmission mechanism 20 and the center differential 6 have been assembled, the front wheel output shaft 9 is inserted into the fitting bore 24 of the driven sprocket 19 until it is splined in the latter. When, in this case, the 0-ring 41 fitted in advance on the outer circumference of the front wheel output shaft 9 comes into that fitting bore 24, then the inside of this fitting bore 24 is sealed up so that its internal pressure rises in accordance with the advance of the front wheel output shaft 9. This pressure rise warps the lip 40 of the oil seal 36, which is fitted between the aforementioned plug 35 and the inner circumference of the fitting bore 24, to make a clearance so that the air is released from the fitting bore 24 into the chain chamber 14 via the slit 39. In other words, the internal pressure of the fitting bore 24 is maintained below a predetermined level so that the front wheel output shaft 9 can be smoothly inserted while preventing the plug 35 from coming out.

Moreover, the aforementioned driven sprocket 19 can be made short, because its inside or fitting bore 24 provides a fitting portion for the front wheel output shaft 9 so that it does not require any special fitting allowance extending in the axial direction.

In the four wheel drive torque transfer mechanism 1 thus assembled, the drive force is imparted from the transmission output shaft 4 to the carrier 59 of the center differential 6 so that it is transmitted partly from the ring gear 60 to the rear wheel output shaft 7 and partly from the sun gear 61 to the drive sprocket 18. In this case, the differential control clutch 5 is slip-controlled to limit the differentiation of the center differential 6 to some extent so that the torque distribution ratio between the rear wheel output shaft 7 and the drive sprocket 18 does not take a constant value but varies in accordance with the extent of limitation to the differentiation. The drive force thus imparted to the drive sprocket 18 is transmitted through the silent chain 17 and the driven sprocket 19 to the front wheel output shaft 9 and further to the front propeller shaft 10 coupled with the output shaft 9 through the joint 42. In other words, there is established a four wheel drive which has the different torque distribution ratios between the front and rear wheels.

In this drive state, the oil seal 36 sealing up the fitting bore 24 of the front wheel output shaft 9 is subjected to a centrifugal force, while revolving together with the front wheel output shaft 9, so that its lip 40 is warped to establish a clearance at an predetermined or greater r.p.m. This clearance allows the lubrication oil in the chain chamber 14 to flow via the slit 39 of the plug 35 into the fitting bore 24 so that the oil excellently lubricates the splined portions of the front wheel output shaft 9 and the driven sprocket 19.

Figure 6:
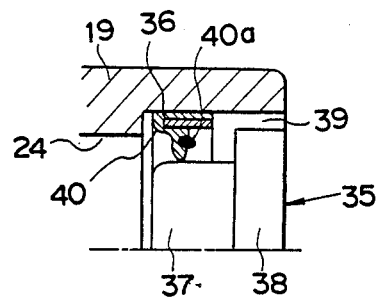
FIG. 6 is a fragmentary section showing another embodiment of the valve means.

Incidentally, if the oil seal 36 acting as the valve means is made so rigid that it will not be warped by the centrifugal force, grease may be applied to the front wheel output shaft 9 and the fitting bore 24 before the output shaft 9 is fitted in the bore 24. Then, with the structure thus far described, the air is not confined in but released from the fitting bore 24 to leave the internal pressure at a low level so that the grease is not blown away but flows all over the gap between the outer circumference of the front wheel output shaft 9 and the inner circumference of the fitting bore 24 to ensure excellent lubrication. In case, on the contrary, positive lubrication is intended with the lubrication oil in the chain chamber 14, a weight 40a may preferably be attached to that portion of the lip 40, which is positioned to face the slit 39, as shown in FIG. 6, so as to promote the warp of the lip 40 by the centrifugal force.

Figure 7:
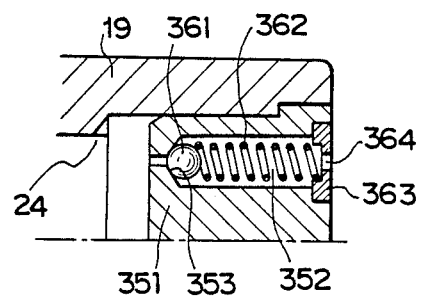
FIG. 7 is a fragmentary section showing another embodiment of valve means.

According to another embodiment of the present invention, on the other hand, the valve member for releasing the air from the fitting bore 24 may be constructed as shown in FIG. 7. In the end portion of the fitting bore 24 positioned in the chain chamber 14, there is closely fitted a plug 351 which is formed at its offset portion with an air communication hole 352 which extends in the axial direction. In this air communication hole 352, there are fitted a ball 361 acting as a valve member and a spring 362. The air communication hole 352 is composed of a larger-diameter portion formed to extend a predetermined length from the rear face (i.e., the righthand end face of FIG. 7) of the plug 351, and a smaller-diameter portion opening into the front face (i.e., the lefthand end face of FIG. 7) of the plug 351. The leading end of the larger-diameter portion has its inner end face formed into a tapered face 353 acting as a valve seat on which the ball 361 is to be seated. The spring 362 urges the ball 361 onto the tapered face 353 and is sandwiched between the ball 361 and an end plate 363 which is fitted in the rear end opening of the air communication hole 352. Moreover, this end plate 363 is formed with a vent hole 364 for providing communication between the air communication hole 352 and the chain chamber 14.

Thus, with the structure shown in FIG. 7, the ball 361 is brought out of engagement with the tapered face 353 against the urging force of the spring 362 by the internal pressure raised as the front wheel output shaft 9 is inserted into the fitting bore 24, so that the valve is opened. As a result, the air in the fitting bore 24 is released via the air communication hole 352 and the vent hole 364 into the chain chamber 14 so that the internal pressure of the fitting bore 24 is maintained below a predetermined pressure. In case the driven sprocket 19 revolves, on the other hand, the ball 361 is moved along the tapered face 353 by the centrifugal force to open the valve. This allows the lubrication oil in the chain chamber 14 to flow via the vent hole 364 and the air communication hole 352 into the fitting bore 24 thereby to lubricate the fitted portions of the front wheel output shaft 9 and the driven sprocket 19. Incidentally, in the embodiment of FIG. 7, this check valve may preferably be opened by the centrifugal force. For this operation, it is sufficient that the ball 361 or the spring 362 be offset from the center of revolutions of the plug 351, and the arrangement should not be limited to that shown in FIG. 7. If, on the contrary, another valve member of the check ball type is fitted in the plug 351 in the opposite direction to that shown in FIG. 7, the air in the chain chamber 14 can be introduced into the fitting bore 24 when the front wheel output shaft 9 is extracted from the fitting bore 24, thus smoothing removal of the output shaft 9. In this modification, no problem arises even if the ball valve member is fitted at the center of revolution of the plug 351.

Figure 8:
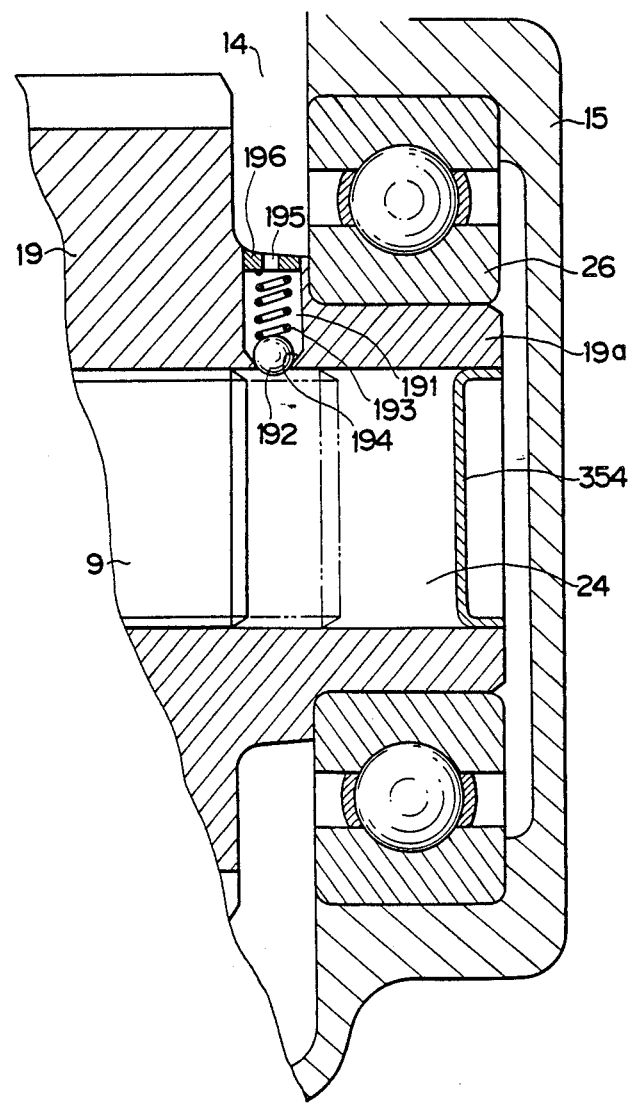
FIG. 8 is a fragmentary section showing still another embodiment in which the valve means is attached to a driven sprocket.

FIG. 8 shows another means for releasing the air from the fitting bore 24 and introducing the lubrication oil into the same bore 24. As shown in FIG. 8, that end portion of the fitting bore 24 formed in the driven sprocket 19, which is located inside of the rear case 15, is sealed up with a plug 354. Moreover, the boss 19a of the driven sprocket 19 is formed at its portion near the bearing 26 with an air communication hole 191 in which are fitted a ball 192 acting as a valve member and a spring 193 for urging the ball 192. More specifically, the opening diameter of the air communication hole 191 at the side of the fitting bore 24 is made smaller than the diameter of the ball 192, and the inner circumference of the air communication hole 191 at the side of the fitting bore 24 is tapered. This tapered face provides a valve seat 194 on which the ball 192 is to be seated to shut off the air communication hole 191. Incidentally, the ball 192 seated on the valve seat 194 has its portion projecting into the fitting bore 24. At the upper opening end of the air communication hole 191 shown in FIG. 8, there is fitted an end plate 196 which is formed with a vent hole 195. The spring 193 is sandwiched under compression between the end plate 196 and the ball 192. As a result, the spring 193 urges the ball 192 onto the valve seat 194.

In the structure shown in FIG. 8, the ball 192 is brought into close contact with the valve seat 194 by the urging force of the spring 193 while the front wheel output shaft 9 is not inserted into the fitting bore 24. As a result, the air communication hole 191 is shut off by the ball 192 so that no lubrication oil will leak out from the inside of the case, i.e., the chain chamber 14 via the fitting bore 24. In case, on the other hand, the front wheel output shaft 9 is inserted into the fitting bore 24 up to a position indicated by chain lines in FIG. 8, the ball 192 is disengaged from the valve seat 194 by the front wheel output shaft 9 to open the air communication hole 191. As a result, the air in the fitting bore 24 having been compressed by inserting the front wheel output shaft 9 is released via the air communication hole 191 so that the front wheel output shaft 9 can be smoothly inserted into the fitting bore 24 without being subjected to any reaction of the compressed air. Incidentally, if the elastic force of the spring 193 is weakened, the ball 192 leaves the valve seat 194 as the air pressure in the fitting bore 24 rises, so that the air can be released from the fitting bore 24 even while the front wheel output shaft 9 is being inserted into the fitting bore 24. After having been completely inserted, the front wheel output shaft 9 maintains the ball 192 disengaged from the valve seat 194 to maintain the air communication hole 191 in its open state so that the lubrication oil in the chain chamber 14 flows via the open communication hole 191 into the fitting bore 24 to excellently lubricate the gap between the outer circumference of the front wheel output shaft 9 and the inner circumference of the fitting bore 24. In case the front wheel output shaft 9 is to be extracted, moreover, the air flows from the air communication hole 191 while the output shaft 9 is pushing on the ball 192, so that the output shaft 9 can be smoothly removed.

Figure 9:
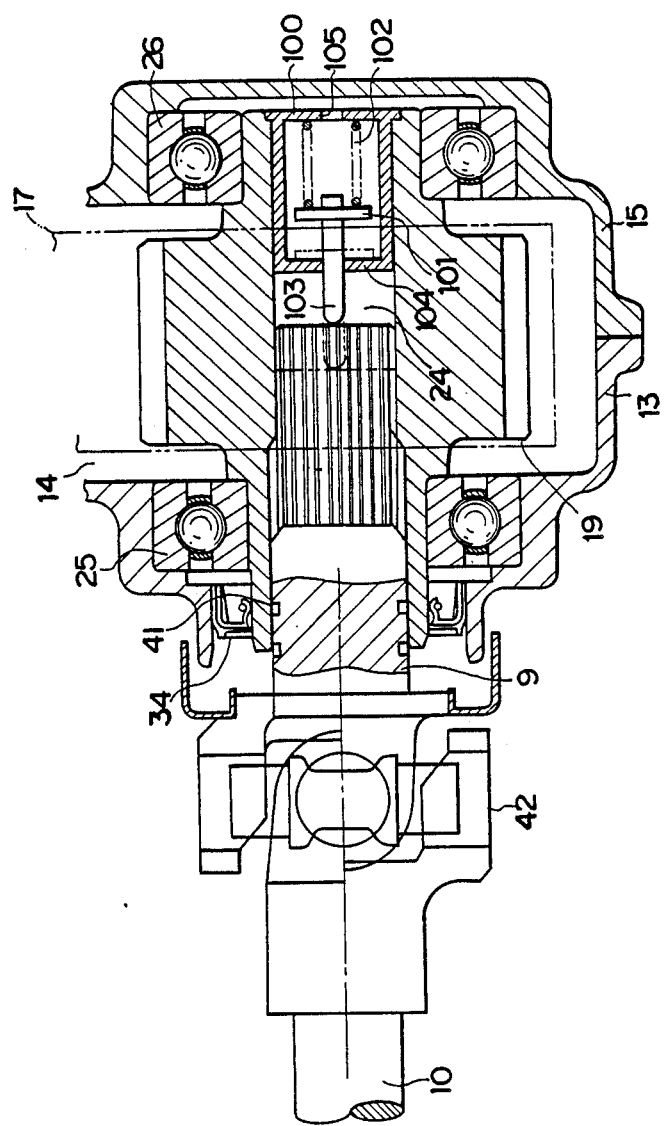
FIG. 9 is a sectional view showing a further embodiment of the valve means which has its open state maintained by a front wheel output shaft.

In addition to the structure shown in FIG. 8, the valve means for providing the communication between the insides of the fitting bore 24 and the rear case 15 by keeping the open state with the front wheel output shaft 9 may employ a structure shown in FIG. 9. In the right-hand end portion of the fitting bore 24, as shown in FIG. 9, there is fitted a hollow cylinder tube 100, in which a valve member 101 and a spring 102 are arranged. The valve member 101 is made of a disc carrying at its center a push rod 103, which extends through the cylinder tube 100 into the fitting bore 24. When the disc of the valve member 101 comes into close contact with a valve seat 104 of the cylinder tube 100, it shuts off the hole through which the push rod 103 extends. The spring 102 urges the valve member 101 toward the valve seat 104. The end face of the cylinder tube 100 opposite to the valve seat 104 is formed with a vent hole 105 which opens into the rear case 15.

With the structure shown in FIG. 9, the valve member 101 is brought into close contact with the valve seat 104 if the front wheel output shaft 9 is outside of the fitting bore 24, so that no communication is established between the fitting bore 24 and the case 15. As a result, the lubrication oil in the case 15 will not leak to the outside through the fitting bore 24. If the front wheel output shaft 9 is inserted into the fitting bore 24, on the contrary, the internal pressure of the fitting bore 24 rises to bring the valve member 101 out of engagement with the valve seat 104. As a result, the air in the fitting bore 24 is released via the cylinder tube 100 into the case 15 so that the front wheel output shaft 9 is smoothly inserted without being subjected to the reaction of the compressed air. When the front wheel output shaft 9 comes into abutment against the push rod 103 and pushes it, the valve member 101 is brought away from the valve seat 104 so that the valve is opened. Then, the compressed air in the fitting bore 24 is released, and the lubrication oil flows out of the case 15 into the fitting bore 24 to excellently lubricate the gap between the front wheel output shaft 9 and the fitting bore 24. In case the front wheel output shaft 9 is to be extracted, on the other hand, the fitting bore 24 freely admits the air while the push rod 103 is in abutment against the front wheel output shaft 9 to continue the open state, so that the front wheel output shaft 9 can be smoothly removed.

The individual structures thus far described contemplate damping of the fluctuations in the internal pressure of the fitting bore 24 by feeding or releasing the air to or from the inside of the fitting bore so that the front wheel output shaft 9 may be smoothly inserted or extracted. This smooth insertion or extraction can be effected even if a structure shown in FIG. 10 or 11 is adopted in place of the foregoing ones.

Figure 10:
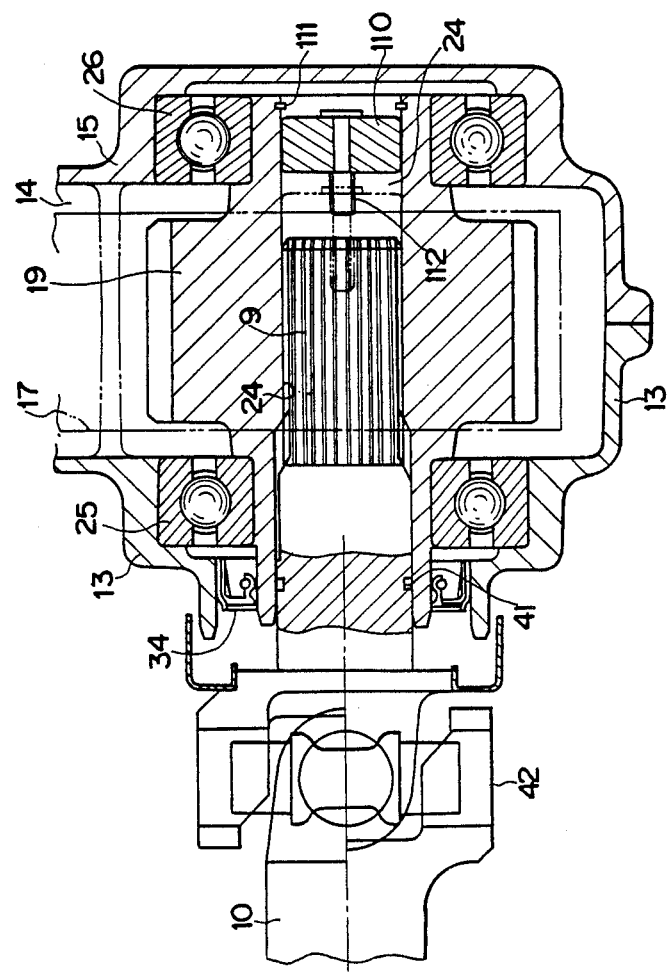
FIG. 10 is a sectional view showing a further embodiment in which fluctuations of an internal pressure in a fitting bore are damped by a piston fitted in the fitting bore.
Figure 11:
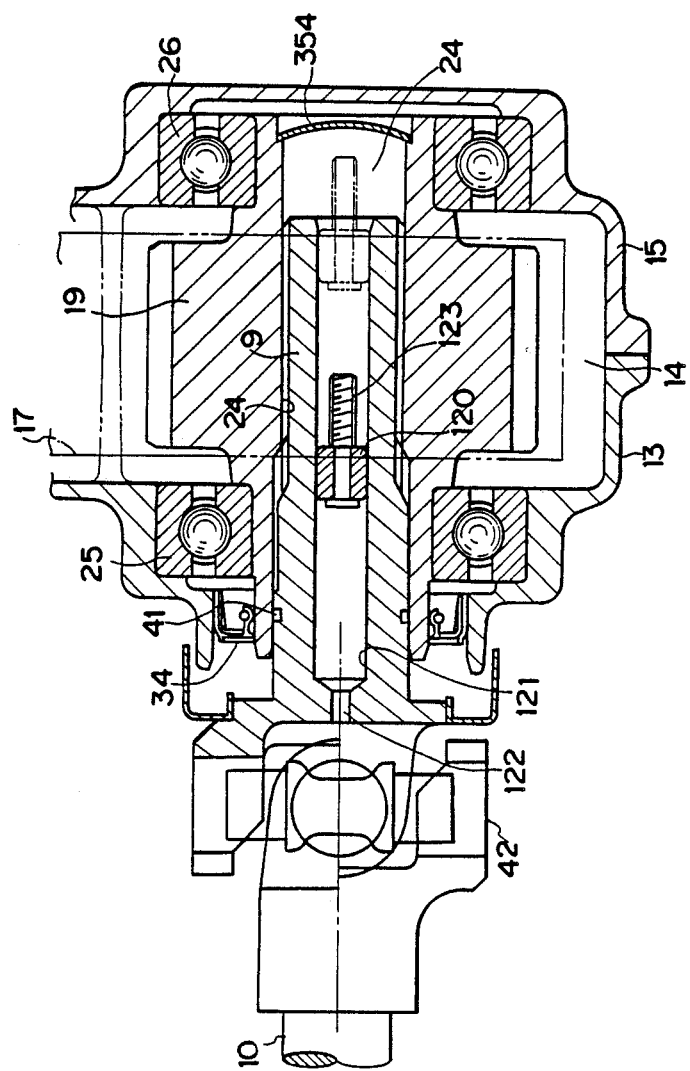
FIG. 11 is a further embodiment in which the front wheel output shaft is equipped with a piston for damping the fluctuations in the pressure.

As shown in FIG. 10, a sealing piston 110 is fitted in the fitting bore 24, and a snap ring 111 for preventing the piston 110 from coming out is fitted in the open end of the fitting bore 24 located in the case 15. The piston 110 is provided for shutting off the fitting bore 24 and is made of a disc of an oil-resisting synthetic resin, for example. The piston 110 thus made is so fitted in the fitting bore 24 as can slide on the inner circumference of the bore 24 while maintaining liquid-tightness. From the center of the piston 110, there projects to the left of FIG. 10 a threaded shaft 112 which is engaged with the (not-shown) operation member inserted from the outside into the fitting bore 24 to move the piston 110.

With the structure shown in FIG. 10, the piston 110 is positioned, as indicated by chain lines in FIG. 10, for example, before the front wheel output shaft 9 is inserted into the fitting bore 24. This positioning of the piston 110 can be effected by engaging the not-shown operation member via the threaded shaft 112 to move the piston 110. If, in this state, the front wheel output shaft 9 is inserted into the fitting bore 24, a considerable gap is formed between the front wheel output shaft 9 and the fitting bore 24 until the O-ring 41 is fitted in the fitting bore 24, so that the air in the fitting bore 24 is released to the outside via that gap. After the 0-ring 41 comes into engagement with the fitting bore 24 to establish air-tightness in the gap between the front output shaft 9 and the fitting bore 24, the air in the fitting bore 24 is compressed. If this internal pressure of the fitting bore 24 rises, the piston 110 is retracted to the right of FIG. 10 so that the internal pressure of the fitting bore 24 will not rise to an especially high level. As a result, the front wheel output shaft 9 can be smoothly inserted into the fitting bore 24 without receiving any reaction from the compressed air.

Incidentally, in the structure shown in FIG. 10, the fitting bore 24 is completely sealed up so that no lubrication oil can be supplied. If, however, grease is injected in advance into the fitting bore 24 at the lefthand side of the piston 110, as viewed in FIG. 10, it can lubricate the gap between the front wheel output shaft 9 and the fitting bore 24.

FIG. 11 shows an embodiment in which a sealing piston 120 is fitted in the front wheel output shaft 9. More specifically, the open end of the fitting bore 24 located in the case 15 is sealed up with the plug 354, and the front wheel output shaft 9 is formed on its center axis with a slide bore 121 which opens at its one end into the leading end portion of the front wheel output shaft 9 and communicates at the other with the outside via a vent hole 122. The piston 120 is provided for sealing up that slide bore 121 and made of a cylinder of an oil-resisting synthetic resin, for example. The piston 120 thus made is in contact with the slide bore 121 such that it can slide on the inner circumference of the bore 121 while maintaining liquid-tightness. This piston 120 carries at its center a threaded shaft 123 which projects to the right of FIG. 11. This threaded shaft 123 is engaged with a (not-shown) operation member which is inserted from the outside into the slide bore 121 to provide an engagement portion for moving the piston 120.

In the structure shown in FIG. 11, the piston 120 is positioned in the leading end portion of the slide bore 121, as indicated by chain lines in FIG. 11, and the front wheel output shaft 9 is inserted into the fitting bore 24. In this case, too, the air in the fitting bore 24 is released to the outside from the gap between the front wheel output shaft 9 and the fitting bore 24, as in the structure shown in FIG. 10, until the 0-ring 41 is fitted in the fitting bore 24. After the 0-ring 41 has been fitted in the fitting bore 24, air-tightness is established between the front wheel output shaft 9 and the fitting bore 24 so that the air in the fitting bore 24 is compressed. If, however, the internal pressure of the fitting bore 24 rises, the piston 120 is retracted to the left of FIG. 11 so that the internal pressure of the fitting bore 24 will not rise to an excessively high level. This prevents difficulties in inserting the front wheel output shaft 9 due to the reaction of the compressed air so that the output shaft 9 can be smoothly inserted into the fitting bore 24. Incidentally, in the structure shown in FIG. 11, too, the gap between the front wheel output shaft 9 and the fitting bore 24 can be lubricated by injecting grease in advance into the fitting bore 24.

In the individual embodiments thus far described, the front wheel output shaft is coupled with the driven sprocket by way of example. In addition to those embodiments, the present invention can be applied to another structure in which a suitable shaft is coupled by fitting it in a rotating member such as a gear or a pulley.

As is now apparent from the description thus far made, according to the coupling structure of the present invention, the air in the coupling fitting bore formed in the rotating member can be released when the shaft member is fitted for coupling in the fitting bore, so that the rise in the internal pressure of the fitting bore can be prevented, assuring smooth insertion of the shaft member. If, moreover, the case has its inside filled up with the lubrication oil with the rotating member being assembled in the case, the leakage of the lubrication oil via the fitting bore can be prevented by the valve member so that the coupling of the shaft member can be accomplished at the final step, for example. In the four wheel drive torque transfer mechanism or the automatic gear transmission assembly which is manufactured by charging the inside of the case in advance with the lubrication oil, for example, the propeller shaft can be assembled in advance with the front or rear wheel output shaft so that its dynamic balance can be measured and adjusted more accurately than the prior art. Furthermore, the coupling structure of the present invention can reduce wear and improve durability because it can ensure supply of the lubrication oil or grease to the inside of the fitting bore, i.e., to the coupled portions between the rotating member and the shaft member. According to the present invention, furthermore, the inside of the rotating member provides the coupling portion to the shaft member so that any special fitting allowance projecting in the axial direction need not be retained in the rotating member, to reduce the axial length of the rotating member.

Obviously, numerous modifications and variations of the present invention are possible in light of the above teachings. It is therefore to be understood that within the scope of the appended claims, the invention may be practiced otherwise than as specifically described herein.

We claim:

1. A coupling structure for a rotating member and a shaft, comprising:
   a fitting bore in said rotating member, and extending along the center axis thereof, said fitting bore opening into at least one of the axial end portions of said rotating member and having a diameter larger than an outside diameter of said shaft;
   a case accommodating said rotating member, said rotating member being positioned in said case such that said fitting bore opens toward the outside of said case;
   means for holding said rotating member in said case in a rotatable manner;
   an air communication portion for providing communication between the inside of said fitting bore and said case; and
   valve means for selectively opening and closing said air communication portion,
   wherein said shaft is inserted from the outside of said case into said fitting bore, including means for coupling said shaft to rotate integrally with said rotating member.

2. A coupling structure according to claim 1, wherein the inner face of said fitting bore and the outer face of said shaft are splined, to comprise said coupling means.

3. A coupling structure according to claim 1, wherein said rotating member is wheel having teeth on its outer circumference.

4. A coupling structure according to claim 3, wherein said rotating member is a sprocket wheel for meshing with a chain.

5. A coupling structure according to claim 4, wherein said sprocket wheel has a center portion with teeth on the outer circumference thereof and two bosses projecting forward and backward in an axial direction thereof from said toothed center portion, wherein said means for holding said rotatable member in a rotatable manner comprise bearings fitted on the outer circumference of said bosses.

6. A coupling structure according to claim 1, further comprising a seal member fitted on the outer circumference of said shaft for sealing a gap between the outer circumference of said shaft and the inner circumference of said fitting bore.

7. A coupling structure according to claim 1, wherein said case is filled with lubrication oil.

8. A coupling structure according to claim 1, wherein said air communication means is formed in said rotating member, and wherein said valve means includes:
   a valve member; a valve seat with which said valve member comes into close contact for shutting said air communication means; and elastic means for urging said valve member into close contact with said valve seat.

9. A coupling structure according to claim 8, wherein the urging force of said elastic means is less than a force resulting from the pressure in said fitting bore, whereby said valve member disengages from said valve seat.

10. A coupling structure according to claim 8, wherein said air communication means is a radially extending through hole formed in said rotating member, wherein said valve member is a ball fitted in said through hole, and wherein said valve seat comprises a tapered face formed on the inner circumference of said through hole, said valve seat permitting said ball to partially project into said fitting bore,
    whereby said ball is disengaged from said tapered face to open said air communication portion when said ball is pushed by said shaft inserted into said fitting bore.

11. A coupling structure according to claim 1, wherein said fitting bore has one end opening toward the outside of said case for receiving said shaft and an other end opening within said case, including a plug fixedly fitting in said other end, and wherein said air communication means is formed in said plug.

12. A coupling structure according to claim 11, wherein said plug includes a flange closely fitted in the inner circumference of said fitting bore, and a stem having a smaller diameter than the internal diameter of said fitting bore, wherein said air communication means is formed in said flange, and wherein said valve means is an oil seal having an annular lip of thin film form fitted between the outer circumference of said stem and the inner circumference of said fitting bore, said annular lip comprising means for warping in response to a predetermined with the rise in the internal pressure of said fitting bore, whereby said oil seal separates from one of the outer circumference of said stem and the inner circumference of said fitting bore.

13. A coupling structure according to claim 12, wherein said oil seal is fixedly fitted on the inner circumference of said fitting bore such that the inner circumferential edge of said lip contacts with the outer circumference of said stem, and wherein said lip carries a weight at a portion thereof, whereby communication between the inside of said fitting bore and said case is established when said lip is displaced due to the centrifugal force generated by the rotation of said rotating member acting on said weight.

14. A coupling structure according to claim 11, wherein said air communication means is a through hole formed through said plug, and wherein said valve means includes: a valve member fitted in said through hole; a valve seat with which said valve member comes into close contact for shutting said through hole; an elastic means for urging said valve member into close contact with said valve seat.

15. A coupling structure according to claim 14, wherein the urging force of said elastic means is less than a force resulting from the pressure in said fitting bore when said shaft is inserted therein, whereby said valve member disengages from said valve seat.

16. A coupling structure according to claim 14, wherein said through hole is formed in a position offset from the center of said plug, wherein said valve member is a ball movably fitted in said through hole, wherein said valve seat is formed in said through hole, and wherein said ball and valve member include means permitting said valve member to disengage from said valve seat by the centrifugal force generated by the rotation of said rotating member.

17. A coupling structure according to claim 14, wherein said air communication means includes two through holes formed in said plug, and wherein one of said valve means is disposed in each of said through holes, one of said valve means comprising means which is opened when the pressure in said fitting bore rises and the other of which comprises means which is opened when the pressure in said fitting bore drops.

18. A coupling structure according to claim 1, wherein said fitting bore has one end opening toward the outside of said case for receiving said shaft and an other end opening within said case, and wherein said valve means includes: a valve member fitted in said other open end such that it can move in the axial direction of said fitting bore; elastic means for urging said valve member toward said one open end; a valve seat with which said valve member urged by said elastic means comes into close contact; and a push rod projecting from said valve member towards said one end and through said valve seat, whereby said valve means is opened when said shaft inserted into said fitting bore pushes with said valve member via said push rod.

19. A coupling structure for a rotating member and a shaft, comprising:
a fitting bore in said rotating member, and extending along the center axis thereof, said fitting bore having two open ends opening at axial end portions of said rotating member;
a case accommodating said rotating member, said rotating member being positioned in said case such that one of said open ends of the fitting bore opens toward the outside of the case for receiving the shaft and the other of said open ends of the fitting bore opens into the inside of the case;
means for holding said rotating member in a rotatable manner;
a piston member fitted in said fitting bore at the other of said open ends so as to be slidable in the axial direction of said fitting bore in response to fluctuations in the internal pressure of said fitting bore and comprising means for maintaining liquid-tightness with the inner circumference of said fitting bore.

20. A coupling structure according to claim 19, wherein said case is filled with lubrication oil.

21. A coupling structure according to claim 19, wherein said piston member carries on a face thereof, facing said one open end, an engagement portion which projects in the axial direction.

22. A coupling structure according to claim 21, wherein said engagement portion is a threaded shaft.

23. A coupling structure according to claim 19, wherein a portion of said fitting bore closer to said one open end than said piston member is filled with a lubricant.

24. A coupling structure for a rotating member and a shaft, comprising:
a fitting bore in said rotating member, and extending along the center axis thereof, said fitting bore having two open ends opening at axial end portions of said rotating member,
a case accommodating said rotating member, said rotating member being positioned in said case such that one of said open ends of the fitting bore opens toward the outside of the case for receiving the shaft and the other of said open ends of the fitting bore opens into the inside of the case;
means for holding said rotating member in a rotatable manner;
a sealing member for sealing said other open end,
a leading end portion formed on said shaft to be inserted into said fitting bore,
a piston slide bore formed in the axial direction of said shaft, said piston slide bore having one side opening into said leading end portion and another side communicating with the outside of said shaft, and
a piston member fitted in said piston slide bore, which is adapted to slide in the axial direction of said piston slide bore in response to fluctuations in the internal pressure of said piston slide bore and comprising means for maintaining liquid-tightness with the inner circumference of said piston slide bore.

25. A coupling structure according to claim 24, wherein said case is filled with lubrication oil.

26. A coupling structure according to claim 24, wherein said piston member carries on a face thereof facing the leading end portion of said shaft an engagement portion which projects in the axial direction of said piston slide bore.

27. A coupling structure according to claim 26, wherein said engagement portion is a threaded shaft.

* * * * *

UNITED STATES PATENT AND TRADEMARK OFFICE
CERTIFICATE OF CORRECTION

PATENT NO. : 4,940,446
DATED : JULY 10, 1990
INVENTOR(S) : MASAKI INUI ET AL.

It is certified that error appears in the above-identified patent and that said Letters Patent is hereby corrected as shown below:

On the title page:
In the Foreign Application Priority Data, delete "61-22778" and insert --61-227788--.

Signed and Sealed this

Fifth Day of November, 1991

Attest:

HARRY F. MANBECK, JR.

*Attesting Officer*  *Commissioner of Patents and Trademarks*